(12) United States Patent
Dettinger et al.

(10) Patent No.: US 10,731,709 B2
(45) Date of Patent: Aug. 4, 2020

(54) CLUTCH APPARATUS AND FLAP DEVICE FOR A FRESH-AIR SYSTEM HAVING A CLUTCH APPARATUS

(71) Applicant: Mahle International GmbH, Stuttgart (DE)

(72) Inventors: Marco Dettinger, Pforzheim (DE); Mathias Endress, Stuttgart (DE); Wolfgang Gueth, Stuttgart (DE); Johannes Weinmann, Stuttgart (DE)

(73) Assignee: MAHLE INTERNATIONAL GMBH (DE)

( * ) Notice: Subject to any disclaimer, the term of this patent is extended or adjusted under 35 U.S.C. 154(b) by 189 days.

(21) Appl. No.: 15/739,223

(22) PCT Filed: Jun. 22, 2016

(86) PCT No.: PCT/EP2016/064376
§ 371 (c)(1),
(2) Date: Dec. 22, 2017

(87) PCT Pub. No.: WO2016/207197
PCT Pub. Date: Dec. 29, 2016

(65) Prior Publication Data
US 2018/0274595 A1    Sep. 27, 2018

(30) Foreign Application Priority Data

Jun. 26, 2015    (DE) .................. 10 2015 211 946

(51) Int. Cl.
*F16D 3/04*    (2006.01)
(52) U.S. Cl.
CPC ...................... *F16D 3/04* (2013.01)
(58) Field of Classification Search
CPC .................. F16D 3/04; F01C 17/066
(Continued)

(56) References Cited

U.S. PATENT DOCUMENTS

| 4,464,142 A * | 8/1984 | Bridges ..................... F02P 7/10 |
| | | 123/146.5 A |
| 5,284,455 A * | 2/1994 | Kuribayashi ............. F16D 3/04 |
| | | 464/105 |

(Continued)

FOREIGN PATENT DOCUMENTS

| DE | 102007022507 A1 | 11/2007 |
| DE | 102006043897 A1 | 3/2008 |

(Continued)

OTHER PUBLICATIONS

"Machine Translation for DE102014219364." 2020.*
English abstract for JP-H02-240411.
English abstract for DE-102013215623.

*Primary Examiner* — Edelmira Bosques
*Assistant Examiner* — Christopher Matthew Odell
(74) *Attorney, Agent, or Firm* — Fishman Stewart PLLC

(57) ABSTRACT

A clutch apparatus may include a first shaft member having a first end portion including axially extending first protrusions. The clutch apparatus may also include a second shaft member arranged axially opposite the first shaft member, the second shaft member having a second end portion including axially extending second protrusions. Additionally, the clutch apparatus may include a clutch member having a disk-shaped main body arranged between the first shaft member and the second shaft member, the clutch member including an annular rim that encircles the main body and protrudes beyond the the main body in both axial directions, the annular rim including first recesses disposed on a first side of the clutch member and second recesses disposed on a second side of the clutch member. The second end portion may further include at least one latching element and the clutch member may further include at least one mating latching element.

20 Claims, 3 Drawing Sheets

(58) Field of Classification Search
USPC .................................................. 464/102, 104
See application file for complete search history.

(56) References Cited

U.S. PATENT DOCUMENTS

| | | | |
|---|---|---|---|
| 7,955,005 B2 | 6/2011 | Kino et al. | |
| 8,187,106 B2 | 5/2012 | Muenich et al. | |
| 9,740,163 B2 * | 8/2017 | Xiao | G03G 21/1857 |
| 2009/0230825 A1 * | 9/2009 | Braun | F16D 3/04 |
| | | | 310/75 D |
| 2012/0308265 A1 * | 12/2012 | Hashimoto | G03G 15/0194 |
| | | | 399/167 |

FOREIGN PATENT DOCUMENTS

| | | | | |
|---|---|---|---|---|
| DE | 10 2006 048 678 A1 | 6/2008 | | |
| DE | 102013215623 A1 | 2/2015 | | |
| DE | 102014219364 A1 * | 3/2016 | ............... | F16D 3/04 |
| JP | H02-240411 A | 9/1990 | | |

* cited by examiner

CLUTCH APPARATUS AND FLAP DEVICE FOR A FRESH-AIR SYSTEM HAVING A CLUTCH APPARATUS

CROSS-REFERENCE TO RELATED APPLICATIONS

This application claims priority to German Patent Application No. DE 10 2015 211 946.7, filed on Jun. 26, 2015, and International Application No. PCT/EP2016/064376, filed on Jun. 22, 2016, the contents of each of which are hereby incorporated by reference in their entirety.

TECHNICAL FIELD

The invention relates to a clutch apparatus for transmitting a torque from a first shaft member to a second shaft member located axially opposite, having a clutch member which is arranged between the two shaft members. The invention further relates to a flap device for a fresh-air system having such a clutch apparatus. The invention further relates to a fresh-air system for a motor vehicle having such a flap device.

BACKGROUND

Such clutch apparatuses are frequently used in motor vehicles, in order to couple actuators to the driven elements. It is frequently necessary that the clutch apparatus is able to compensate a slight tilting or radial displacement. Furthermore, generally there is a lack of space in motor vehicles, so that the clutch apparatus is to be configured in a space-saving manner.

From DE 10 2006 048 678 B4 a clutch apparatus is known for transmitting a torque from a shaft to a shaft located axially opposite, wherein an end portion arranged on the first shaft has radially outwardly directing protrusions situated opposite one another, which engage into axially extending recesses of a clutch member, and an end portion arranged on the second shaft has radially inwardly directing recesses situated opposite one another, which engage into axially extending protrusions of the clutch member.

SUMMARY

The present invention is based on the problem of providing an improved, or at least different, embodiment of a clutch apparatus, which is distinguished by a compact construction and a simple assembly.

This problem is solved according to the invention by the subjects of the independent claim(s). Advantageous further developments are the subject of the dependent claims.

The invention is based on the general idea of using for the clutch apparatus a clutch member which can be fastened to at least one of the shaft members and which nevertheless can compensate both a tilting and also a radial displacement. According to the invention, provision is made that the second end portion has at least one latching element, such as a male latching body, and that the clutch member has at least one mating latching element, complementary thereto, such as a mating female latching structure, on the second side. Through the latching element and the mating latching element, the clutch member can be held detachably on the second end portion of the second shaft member. On assembly of the clutch apparatus, the clutch member can therefore be held by the second end portion of the second shaft member, so that the clutch member does not have to be separately held and guided, in order to assemble the clutch apparatus. Thereby, the assembly of the clutch apparatus is therefore considerably simplified.

A favourable variant makes provision that the respective latching element and the respective mating latching element engage into one another and hold the clutch member axially on the second end portion. Thereby, as described above, the assembly of the clutch apparatus can be facilitated.

A particularly favourable variant makes provision that the respective latching element is formed by a latch nose. Latch noses have proved to be successful as a latching element, so that a simple and reliable latching connection is made possible.

A further particularly favourable variant makes provision that the respective mating latching element is formed by a latching contour which is formed on the annular rim. The latching element can engage into this latching contour, in order to produce a latching connection.

An advantageous possibility makes provision that the respective mating latching element is formed on an inner side of the annular rim protruding over the main body. Through this configuration of the latching connection, no additional space is required for the latching connection. Consequently, through the latching connection the assembly of the clutch apparatus can therefore be facilitated, without requiring additional installation space.

A particularly advantageous possibility makes provision that two latching elements are provided, which lie diametrically opposite one another and/or that two mating latching elements are provided, which lie diametrically opposite one another. Two latching elements and mating latching elements are sufficient in order to produce a sufficiently stable latching connection between the clutch member and the second shaft member. In particular, through the diametric arrangement of the latching elements and of the mating latching elements to one another, the clutch member can be held better on the second shaft member. Therefore, a tendency of the clutch member to tilt with respect to the end portion of the second shaft member is reduced.

It is expedient that the clutch member has a disk-shaped main body, that the clutch member has an annular rim that encircles the main body and protrudes beyond the main body axially on both sides, that first recesses are introduced into the annular rim on a first side of the clutch member, that second recesses are introduced into the annular rim on the second side of the clutch member, that the first shaft member has a first end portion which has axially extending first protrusions, that at least one such first protrusion of the first end portion engages into at least one of the first recesses of the clutch member, that the second shaft member has a second end portion which has axially extending second protrusions, and that at least one such second protrusion of the second end portion engages into at least one of the second recesses of the clutch member. Through the disk-shaped main body, an axially space-saving clutch member is formed. Therefore, through such a clutch apparatus, installation space can be saved. Furthermore, the configuration of the recesses in the annular rim of the clutch member enables a torque-proof coupling of the clutch member with the respective shaft members, so that a torque-proof coupling can also take place between the two shaft members. At the same time, this construction permits an easy radial displacement or a tilting of the two shaft members with respect to one another.

An expedient solution makes provision that the protruding rim occupies more than half of the circumference in a circumferential direction, whilst the first recesses in the rim taken together in the circumferential direction occupy less than half of the circumference, and the second recesses in the rim taken together in the circumferential direction occupy less than half of the circumference.

In the description and in the enclosed claims, the terms "axial", "radial", "circumferential direction" and "circumference" refer to the main body of the clutch member.

A further expedient solution makes provision that the first protrusions occupy less than half of the circumference in the circumferential direction and that the second protrusions occupy less than half of the circumference.

A favourable possibility makes provision that respectively two such recesses lie diametrically opposite one another on the respective side of the clutch member. Thereby, a tilting of the two shaft members with respect to one another can be better compensated.

A further favourable possibility makes provision that on the first side and on the second side of the clutch member respectively two recesses are introduced into the annular rim. This configuration also increases the tolerance of the clutch apparatus against an axial tilting of the two shaft members with respect to one another.

A particularly favourable possibility makes provision that the first recesses of the first side are arranged offset by approximately 90° to the second recesses of the second side. In this way, a tilting of the two shaft members with respect to one another can be compensated even better.

In the description and the enclosed claims, "approximately 90°" is understood to mean an angle range between 80° and 100°, preferably an angle range between 85° and 95°, particularly preferably an angle range between 88° and 92°.

A further particularly favourable possibility makes provision that the first end portion has two axially extending first protrusions, and that the second end portion has two axially extending second protrusions. Two protrusions which engage into the recesses of the clutch member are sufficient in order to transmit a torque between the clutch member and the shaft members. The use of only two protrusions increases the tolerance of the clutch apparatus against a tilting of the two shaft members with respect to one another.

An advantageous solution makes provision that the first protrusions of the first end portion are arranged eccentrically and lie diametrically opposite one another. Through the fact that the protrusions are arranged eccentrically, these do not lie on an axis of the respective shaft member. Thereby, the protrusions can transmit a torque to the shaft member in a particularly favourable manner Through the fact that the protrusions lie diametrically opposite one another, the load of the bearing of the shaft member is reduced.

A further advantageous solution makes provision that the second protrusions of the second end portion are arranged eccentrically and lie diametrically opposite one another. Thereby, the same advantages result as for the first protrusions of the first end portion, to the description of which reference is to be made in this respect.

A particularly advantageous solution makes provision that the first protrusions of the first end portion engage respectively into one of the first recesses on the first side of the clutch member, and that the second protrusions of the second end portion engage respectively into one of the second recesses on the second side of the clutch member. In this way, all the protrusions can be used in order to achieve a torque transmission from the first shaft member to the clutch member and vice versa, and a torque transmission between the clutch member and the second shaft member and vice versa.

Furthermore, the above-mentioned problem is solved by a flap device for a fresh-air system, with at least one flap, which is coupled to a flap shaft in a torque-proof manner, with an actuator for driving the shaft, the actuator having a drive shaft, and with such a clutch apparatus, wherein the first shaft member is connected to the drive shaft in a torque-proof manner, whilst the second shaft member is connected to the flap shaft in a torque-proof manner. Therefore, the advantages of the clutch apparatus can be utilized in the flap device. In this respect, reference is to be made to the above description of the clutch apparatus.

Moreover, the above-mentioned problem is solved by a fresh-air system for a motor vehicle with a distributor housing, which comprises an inlet and an outlet, with such a flap device, wherein the inlet and/or the outlet may be controlled by the flap of the flap device. The advantages of the flap device and thereby also of the clutch apparatus therefore transfer to the fresh-air system, the above description of which is to be referred to in this respect.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
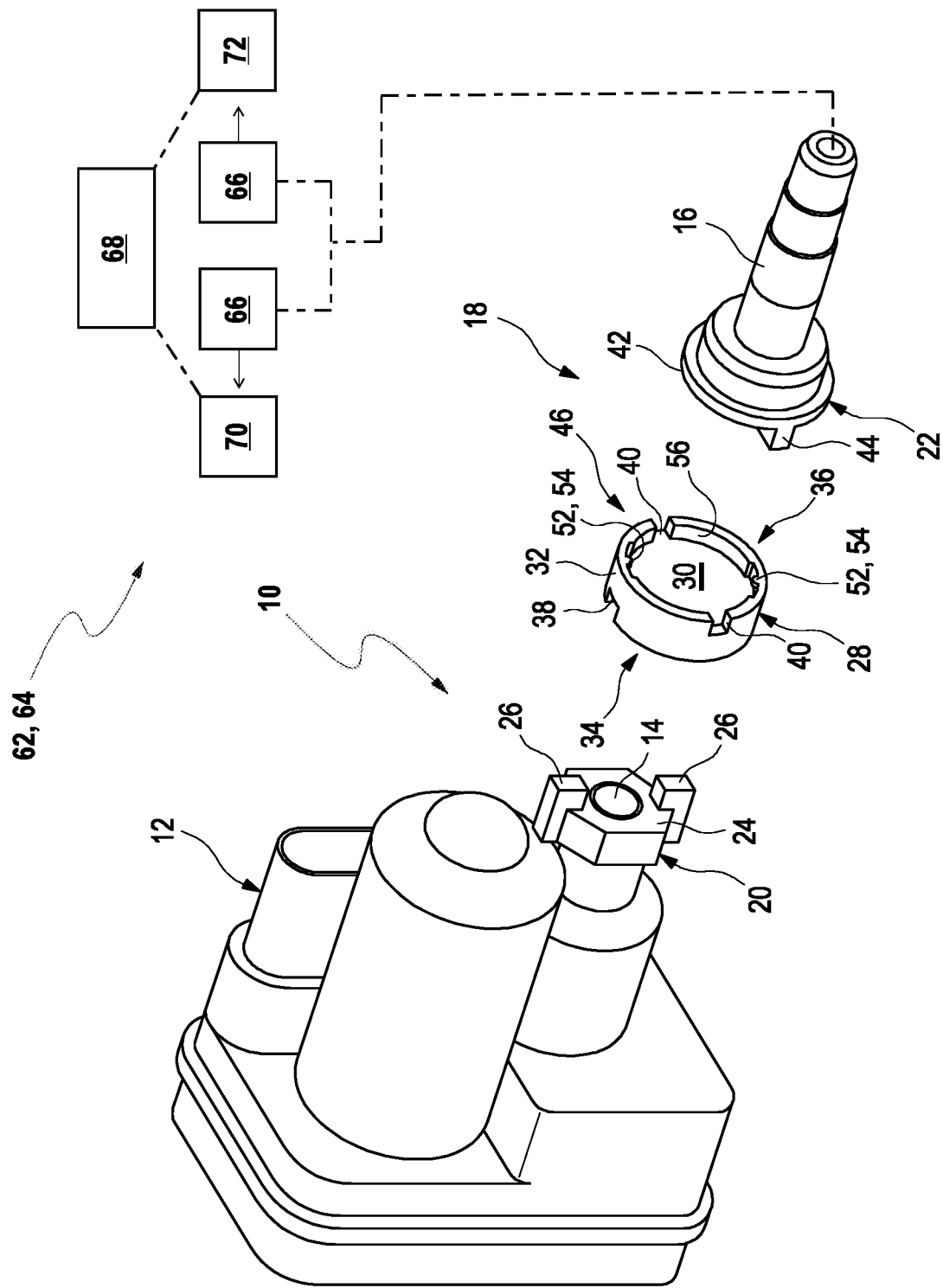
FIG. 1 a perspective illustration of an actuator with a clutch apparatus.

A flap device 10, illustrated partially in FIG. 1, is used for example in a fresh-air system 64 for a motor vehicle 62, in order to direct fresh air in a targeted manner. The flap device 10 has an actuator 12 with a drive shaft 14, which is driven by the actuator 12, a flap 66, which is connected to a flap shaft 16 in a torque-proof manner, and a clutch apparatus 18, which couples the drive shaft 14 to the flap shaft 16 in a torque-proof manner. The motor vehicle 62 may have a distributor housing 68, which may include an inlet 70 and an outlet 72 that may be controlled by the flap 66 of the flap device 10.

The clutch apparatus 18 has a first shaft member 20 and a second shaft member 22. The first shaft member 20 is connected to the drive shaft 14 in a torque-proof manner or is formed by the drive shaft 14. The second shaft member 22 is connected to the flap shaft 16 in a torque-proof manner or is formed by the latter.

The first shaft member 20 has a first end portion 24, on which a plurality, preferably two, first protrusions 26 are formed. The first protrusions 26 are arranged offset radially outwards with respect to an axis of the shaft member 20. Furthermore, the first protrusions 26 extend in an axial direction out from the end portion 24. In installed position, the first protrusions 26 extend in the direction of the clutch member 28.

The clutch member 28 couples the first shaft member 20 and the second shaft member 22 to one another in a torque-proof manner. For this, the clutch member 28 has a main body 30, which is configured substantially in a disk-shaped manner A rim 32 is formed encircling the main body 30, and the rim protrudes in the axial direction beyond the main body 30. In particular, the rim 32 protrudes in the axial direction beyond the main body 30 on a first side 34 of the clutch member 28. In addition, the rim 32 protrudes in the axial direction beyond the main body 30 on a second side 36 of the clutch member 28.

First recesses 38, of which there may be two for example, are introduced into the rim 32 on the first side 34 of the clutch member 28. The first recesses 38 are preferably arranged diametrically with respect to one another. Thereby, torques can be transmitted to the clutch member 28 in a favourable manner via the first recesses 38.

In the installed state, the first side 34 of the clutch member 28 faces the first shaft member 20. Furthermore, the first protrusions 26 of the first end portion 24 engage into the first recesses 38 of the clutch member 28. Thereby, a torque-proof coupling is formed between the clutch member 28 and the first end portion 24 of the first shaft member 20.

Furthermore, the rim 32 of the clutch member 28 has a plurality, two for example, of second recesses 40, which are introduced on the second side 36 of the clutch member 28. The second recesses 40 are arranged diametrically to one another. In the installed state, the second side 36 of the clutch member 28 faces the second shaft member 22.

The two second recesses 40 in their circumferential position are arranged offset to the first recesses 38. Preferably, the second recesses 40 are offset to the first recesses 38 by an angle of approximately 90°. Approximately 90° in the application and in the enclosed claims means preferably in an angle range of 80° to 100°, particularly preferably an angle range of 85° to 95°, even more preferably in an angle range of 88° to 92°.

The second shaft member 22 has a second end portion 42, on which a plurality, for example two, of second protrusions 44 are formed. The second protrusions 44 are arranged offset radially toward the exterior with respect to an axis of the second shaft member 22. They are therefore arranged off-centre, in particular eccentrically. Furthermore, the second protrusions 44 extend in the axial direction out from the second end portion 42 in the direction of the clutch member 28. The two second protrusions 44 are arranged diametrically to one another.

In installed position, the second protrusions 44 engage into the second recesses 40 of the clutch member 28 and therefore form a torque-proof form-fitting coupling between the second end portion 42 of the second shaft member 22 and the clutch member 28.

Through the torque-proof coupling between the first shaft member 20 and the clutch member 28 and the torque-proof coupling between the clutch member 28 and the second shaft member 22, the first shaft member 20 is therefore coupled to the second shaft member 22 in a torque-proof manner Through the diametric arrangement of the first protrusions 26 and second protrusions 44 and the corresponding arrangement of the first recesses 38 and second recesses 40, which in addition are arranged offset to one another by approximately 90°, a tolerance can be achieved with respect to the alignment of the first shaft member 20 to the second shaft member 22. In particular, thereby, a small radial offset between the first shaft member 20 and the second shaft member 22 and a tilting of the axes of the first shaft member and of the second shaft member 22 to one another are able to be tolerated to a small extent. This facilitates considerably the construction of the flap device 10, because the bearing of the first shaft member 20 and of the second shaft member 22 has to be configured less stiffly. Consequently, costs can thereby be saved.

The clutch apparatus 18 has in addition a latching connection 46, by which the clutch member 28 can be detachably connected to the second end portion 42 of the second shaft member 22. Through the latching connection 46, the assembly of the clutch apparatus 18 is facilitated. Through the fact that the clutch member 28 is held on the second end portion 42 and thereby on the second shaft member 22, the clutch member 28 does not have to be separately supported or held, when the clutch apparatus is assembled.

The latching connection 46 has a plurality, two for example, of latching elements 48, which are arranged on the second end portion. Preferably, the two latching elements 48 are arranged diametrically to one another.

The latching elements 48 are arranged offset to the second protrusions 44. Preferably, the latching elements 48 are arranged through approximately 90° to the second protrusions 44.

The latching elements 48 can be formed for example by latching noses 50. The latching noses 50 extend out from the second end portion 42 axially in the direction of the clutch member 28. The nose, having a latching effect, is directed radially outwards here.

The latching connection 46 has mating latching elements 52, which are configured in a complementary manner to the latching elements 48. Preferably, the latching connection 46 has two mating latching elements 52, which are held on the clutch member 28 and lie diametrically opposite one another. The mating latching elements 52 are arranged offset to the second recesses 40. Preferably, the mating latching elements 52 are offset through approximately 90°, in relation to an axis of the clutch member 28, to the second recesses 40. The mating latching elements 52 are formed by latching contours 54, which are arranged on an inner side 56 of the circumferential rim 32.

Thereby, the latching elements 48 can engage into the mating latching elements 52 and therefore hold the clutch member 28 on the second end portion 42 of the second shaft member 22.

Figure 2:
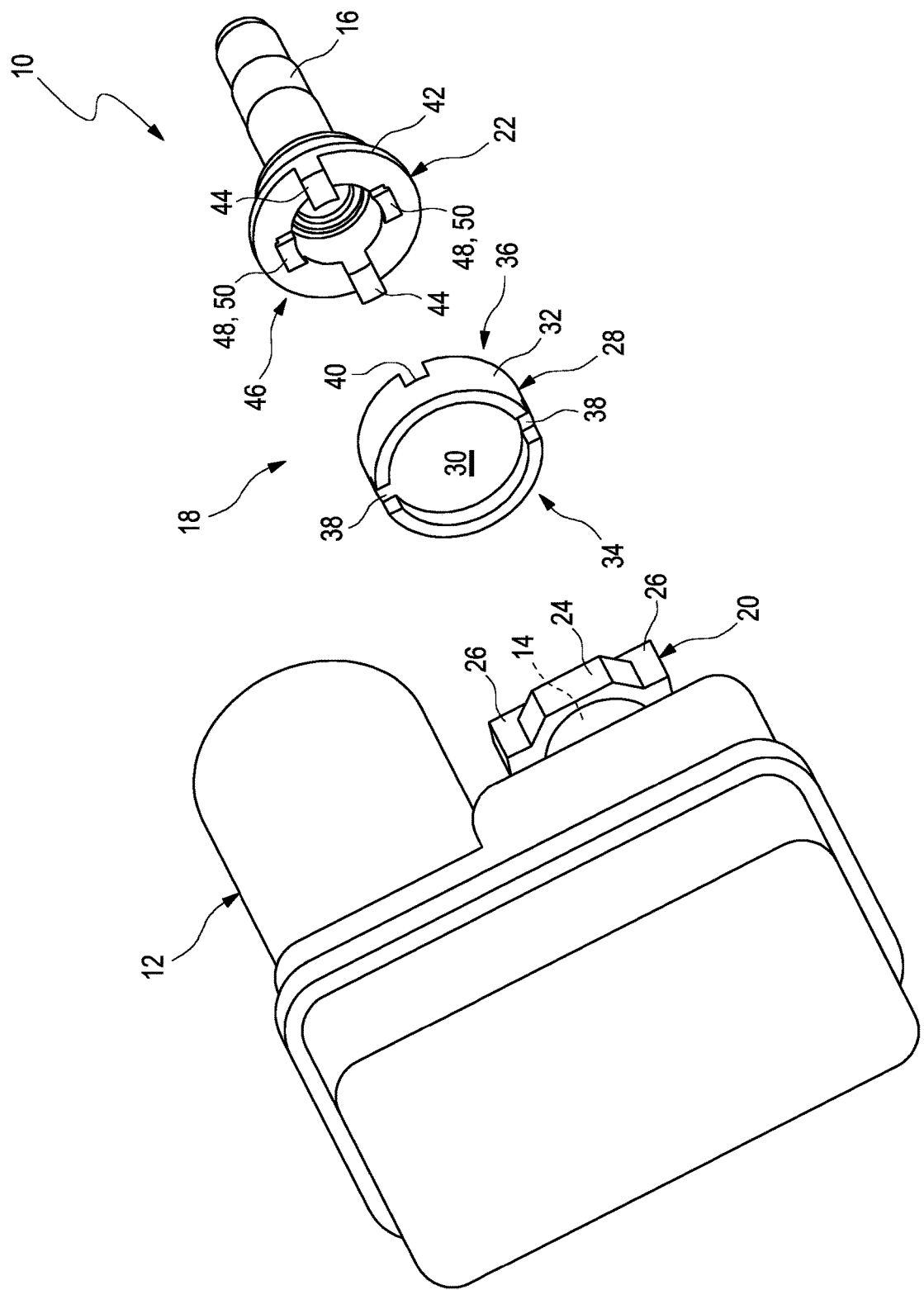
FIG. 2 a perspective view of the clutch apparatus of FIG. 1 from a different direction, FIG. 3 a perspective illustration of a clutch member and of a second shaft member according to a second embodiment of the invention, and FIG. 4 a further perspective illustration of the clutch member and of the second shaft member of FIG. 3, from a different viewing angle.
Figure 3:
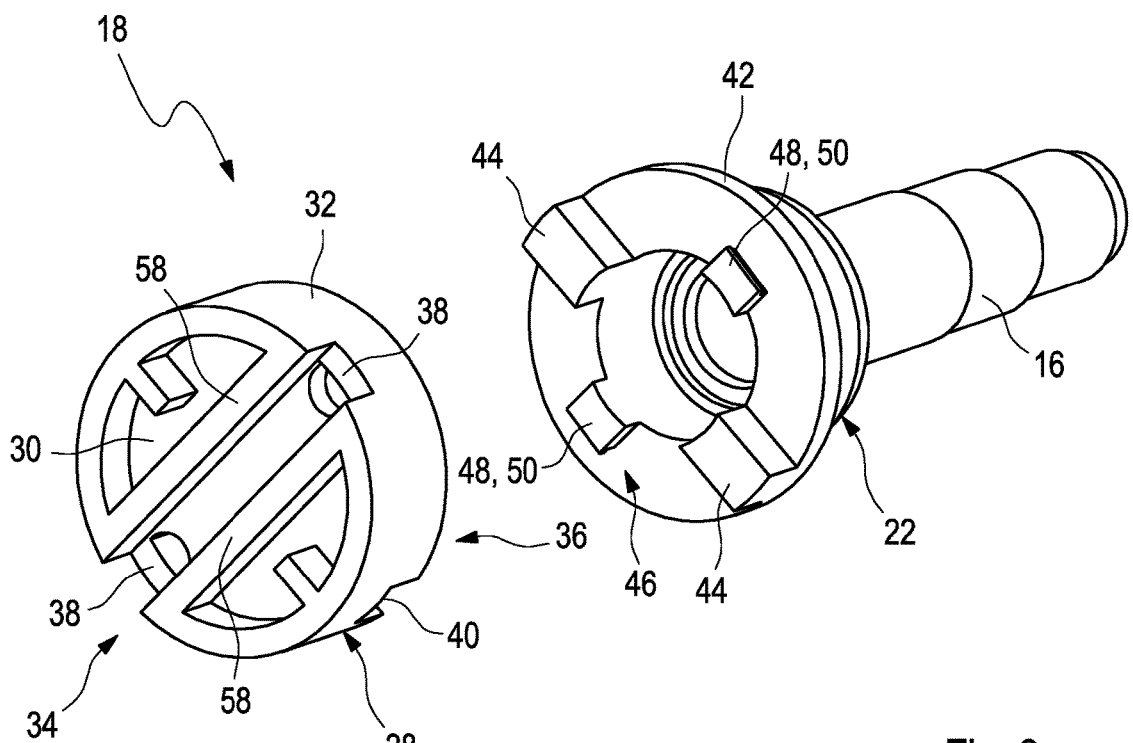
Figure 4:
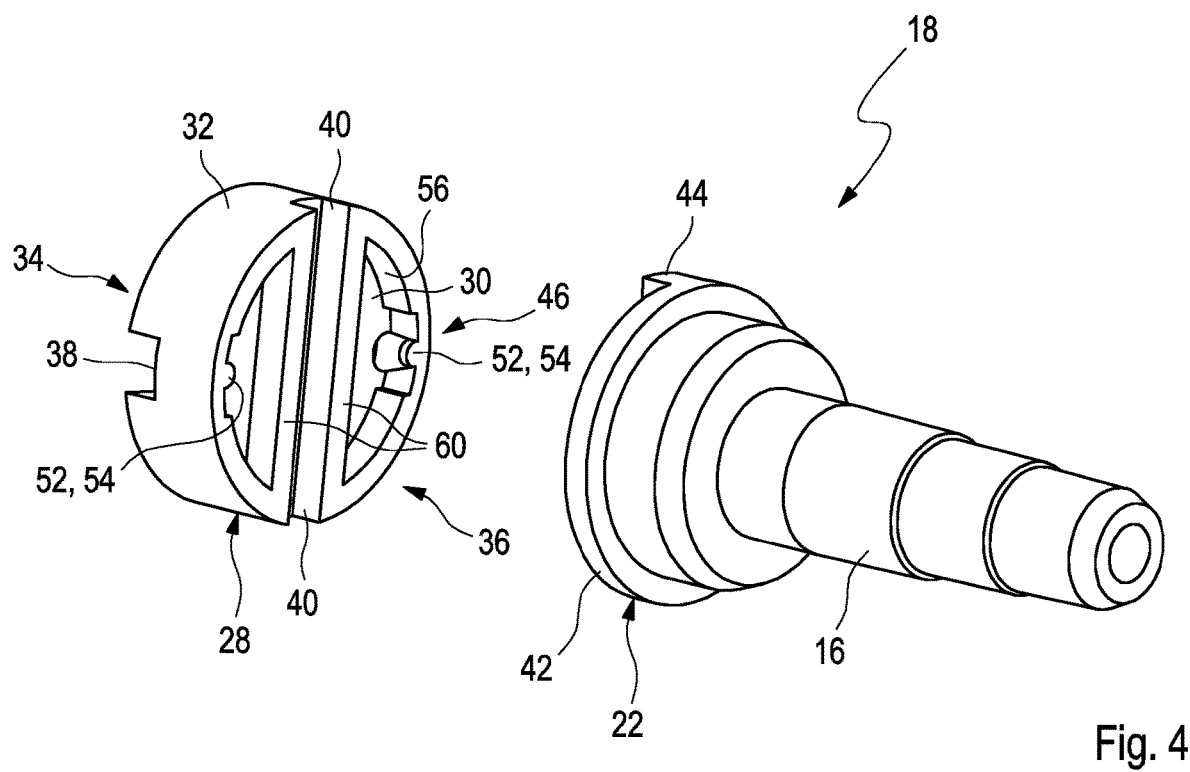

A second embodiment of the clutch apparatus 18, illustrated in FIGS. 3 and 4, differs from the first embodiment of the clutch apparatus 18 illustrated in FIGS. 1 and 2 in that the clutch member 28 has additional reinforcement struts 58.

The clutch member 28 has first reinforcement struts 58 on the first side 34. The first reinforcement struts 58 extend out from the main body 30 in the axial direction. The first reinforcement struts 58 connect the first recesses 38 such that a diametrically extending groove is formed. The first reinforcement struts 58 and the rim 32 are axially flush to one another.

Accordingly, on the second side 36 of the clutch member 28 second reinforcement struts 60 are formed.

Otherwise, the second embodiment illustrated in FIGS. 3 and 4 conforms as regards structure and function to the first embodiment of the clutch apparatus 18 illustrated in FIGS. 1 and 2, the above description of which is to be referred to in this respect.

The invention claimed is:

1. A clutch apparatus, comprising:
a first shaft member;
a second shaft member arranged axially opposite the first shaft member;
a clutch member arranged between the first shaft member and the second shaft member, the clutch member having a disk-shaped main body;
the clutch member including an annular rim that encircles the main body and protrudes beyond the main body in both axial directions;
the annular rim including first recesses disposed on a first side of the clutch member;
the annular rim further including second recesses disposed on a second side of the clutch member;
the first shaft member having a first end portion including axially extending first protrusions;
the second shaft member having a second end portion including axially extending second protrusions;
wherein at least one of the first protrusions is configured to engage into at least one of the first recesses;
wherein at least one of the second protrusions is configured to engage into at least one of the second recesses;
wherein the second end portion further includes at least one male latching body projecting therefrom; and
wherein the clutch member further includes at least one mating female latching structure, complementary to the at least one male latching body and configured to engage the at least one male latching body, disposed on the annular rim on the second side of the clutch member.

2. The clutch apparatus according to claim 1, wherein the at least one male latching body and the at least one mating female latching structure are configured to hold the clutch member axially on the second end portion.

3. The clutch apparatus according to claim 1, wherein:
the at least one male latching body includes a latching nose; and
the at least one mating female latching structure is defined by a latching contour.

4. The clutch apparatus according to claim 1, wherein the at least one mating female latching structure is arranged on an inner side of the annular rim.

5. The clutch apparatus according to claim 1, wherein at least one of:
the at least one male latching body includes two male latching bodies arranged diametrically opposite one another; and
the at least one mating female latching structure includes two mating female latching structures arranged diametrically opposite one another.

6. The clutch apparatus according to claim 1, wherein two of the first recesses are arranged diametrically opposite one another, and wherein two of the second recesses are arranged diametrically opposite one another.

7. The clutch apparatus according to claim 1, wherein only two first recesses are introduced into the annular rim, and wherein only two second recesses are introduced into the annular rim.

8. The clutch apparatus according to claim 7, wherein the first recesses and the second recesses are arranged alternatingly about the annular rim in a circumferential direction such that a circumferential angle of approximately 90° is defined between the first recesses and the second recesses.

9. The clutch apparatus according to claim 1, wherein the first protrusions include two first protrusions and the second protrusions include two second protrusions.

10. The clutch apparatus according to claim 9, wherein at least one of:
the two first protrusions are arranged eccentrically relative to a longitudinal axis of the first shaft member and diametrically opposite one another; and
the two second protrusions are arranged eccentrically relative to a longitudinal axis of the second shaft member and diametrically opposite one another.

11. The clutch apparatus according to claim 1, wherein the first protrusions respectively engage into a corresponding one of the first recesses, and wherein the second protrusions respectively engage into a corresponding one of the second recesses.

12. A flap device for a fresh-air system, comprising:
at least one flap coupled to a flap shaft in a torque-proof manner;
an actuator including a drive shaft;
a clutch apparatus including:
a first shaft member having a first end portion including axially extending first protrusions;
a second shaft member arranged axially opposite the first shaft member, the second shaft member having a second end portion including axially extending second protrusions; and
a clutch member having a disk-shaped main body arranged between the first shaft member and the second shaft member, the clutch member including an annular rim that encircles the main body and protrudes beyond the main body in both axial directions, the annular rim including first recesses disposed on a first side of the clutch member and second recesses disposed on a second side of the clutch member;
wherein at least one of the first protrusions is configured to engage into at least one of the first recesses;
wherein at least one of the second protrusions is configured to engage into at least one of the second recesses;
wherein the second end portion further includes at least one male latching body projecting therefrom;
wherein the clutch member further includes at least one mating female latching structure, complementary to the at least one male latching body and configured to engage the at least one male latching body, disposed on the second side of the clutch member;
wherein the first shaft member is coupled to the drive shaft in a torque-proof manner; and
wherein the second shaft member is coupled to the flap shaft in a torque-proof manner.

13. A fresh-air system for a motor vehicle, comprising:
a distributor housing including an inlet and an outlet; and
a flap device including:
at least one flap coupled to a flap shaft in a torque-proof manner;
an actuator including a drive shaft; and
a clutch apparatus including:
a first shaft member having a first end portion including axially extending first protrusions;
a second shaft member arranged axially opposite the first shaft member, the second shaft member having a second end portion including axially extending second protrusions; and a clutch member having a disk-shaped main body arranged between the first shaft member and the second shaft member, the clutch member including an annular rim that encircles the main body and protrudes beyond the main body in both axial directions, the annular rim including first recesses disposed on a first side of the clutch member and second recesses disposed on a second side of the clutch member;

wherein at least one of the first protrusions is configured to engage into at least one of the first recesses;

wherein at least one of the second protrusions is configured to engage into at least one of the second recesses;

wherein the second end portion further includes at least one male latching body;

wherein the clutch member further includes at least one mating female latching structure, complementary to the at least one male latching body and configured to engage the at least one male latching body, disposed on the second side of the clutch member;

wherein the first shaft member is coupled to the drive shaft in a torque-proof manner;

wherein the second shaft member is coupled to the flap shaft in a torque-proof manner; and wherein at least one of the inlet and the outlet is controlled by the at least one flap.

14. The clutch apparatus according to claim 1, wherein the first recesses collectively extend a circumferential distance that is less than half of a circumference of the annular rim.

15. The clutch apparatus according to claim 1, wherein the second recesses collectively extend a circumferential distance that is less than half of a circumference of the annular rim.

16. The clutch apparatus according to claim 1, wherein:
two of the second protrusions are arranged diametrically opposite one another;
the at least one male latching body includes two male latching bodies arranged diametrically opposite one another; and the two second protrusions and the two male latching bodies are arranged alternatingly about the second end portion in a circumferential direction of the annular rim such that a circumferential angle of approximately 90° is defined between the two second protrusions and the two male latching bodies.

17. The flap device for the fresh-air system according to claim 12, wherein at least one of:
the at least one male latching body includes a latching nose; and
the at least one mating female latching structure is defined by a latching contour disposed on the annular rim.

18. The fresh-air system for the motor vehicle according to claim 13, wherein at least one of:
the at least one male latching body includes a latching nose; and
the at least one mating female latching structure defines a latching contour disposed on the annular rim.

19. The clutch apparatus according to claim 1, wherein the clutch member further includes at least one of:
two first reinforcement struts projecting axially from the main body and extending between two first recesses of the first recesses such that the two first reinforcement struts define a first groove extending between the two first recesses; and
two second reinforcement struts projecting axially from the main body and extending between two second recesses of the second recesses such that the two second reinforcement struts define a second groove extending between the two second recesses.

20. The clutch apparatus according to claim 1, wherein:
the second end portion has an annular axial face defining an axial opening; and
the at least one male latching body is disposed at and projects axially from an inner edge of the annular axial face delimiting the axial opening.

* * * * *